United States Patent
Pinizzotto (10) Patent No.: US 12,170,942 B2
(45) Date of Patent: Dec. 17, 2024

(54) SUBSCRIBER IDENTITY MODULE DEVICE FOR EMERGENCY COMMUNICATIONS

(71) Applicant: T-MOBILE INNOVATIONS LLC, Overland Park, KS (US)

(72) Inventor: Marygrace Pinizzotto, Drexel Hill, PA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 565 days.

(21) Appl. No.: 17/500,624

(22) Filed: Oct. 13, 2021

(65) Prior Publication Data

US 2023/0112492 A1    Apr. 13, 2023

(51) Int. Cl.
*H04W 4/029* (2018.01)
*H04W 4/90* (2018.01)
*H04W 8/18* (2009.01)

(52) U.S. Cl.
CPC ............. *H04W 4/90* (2018.02); *H04W 4/029* (2018.02); *H04W 8/18* (2013.01)

(58) Field of Classification Search
CPC ............ H04W 4/90; H04W 4/29; H04W 8/18
USPC ..................................................... 455/404.1
See application file for complete search history.

(56) References Cited

U.S. PATENT DOCUMENTS

| | | | |
|---|---|---|---|
| 2017/0251347 A1* | 8/2017 | Mehta | H04W 4/08 |
| 2017/0358200 A1* | 12/2017 | Newman | G08B 25/001 |
| 2018/0310159 A1* | 10/2018 | Katz | H04W 4/50 |
| 2022/0279330 A1* | 9/2022 | Makabe | G08B 25/003 |

OTHER PUBLICATIONS

Products, Moxee Signal, https://www.moxee.com/signal, Jan. 15, 2021, 3 pages.

* cited by examiner

*Primary Examiner* — Ted M Wang
(74) *Attorney, Agent, or Firm* — Shook, Hardy & Bacon L.L.P.

(57) ABSTRACT

Methods, devices, and systems are provided for transmitting emergency communications. For example, an emergency communication device may comprise a subscriber identity module (SIM) card, a sensor, a processor, and a memory that stores executable instructions that perform operations when executed by the processor. In some aspects, the device comprises at least three buttons that cause a transmission of an emergency communication to an emergency response server or preprogrammed contact. In response to the sensor of the device detecting a button being pressed, a location service, which determines the location of the device based on the SIM card, is initiated. Accordingly, the device causes the transmission of the emergency communication comprising the location of the device. Further, the emergency communication to the emergency response server may also comprise medical information associated with a user of the user device.

16 Claims, 4 Drawing Sheets

SUBSCRIBER IDENTITY MODULE DEVICE FOR EMERGENCY COMMUNICATIONS

TECHNICAL FIELD

The present invention relates to wireless telecommunications for emergency communications using a portable device comprising a subscriber identity module.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In aspects set forth herein, a device, method, media, and system for transmitting emergency communications are provided. For example, a device comprising a subscriber identity module (SIM) card may be used for initiating a location service to determine a location of the device. In some aspects, the device comprises at least three buttons that cause a transmission of an emergency communication, such as a message comprising the location of the device, to an emergency response server or preprogrammed contact. In response to a user pressing a button of the device, the location service may determine the location of the device based in part on the SIM card. In some aspects, the emergency communication message to the emergency response server or preprogrammed contact may also comprise medical information associated with the user.

BRIEF DESCRIPTION OF THE DRAWINGS

The present technology is described in detail herein with reference to the drawing figures, which are intended to be exemplary and non-limiting in nature, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms 3G Third-Generation Wireless Technology
4G Fourth-Generation Cellular Communication System
5G Fifth-Generation Mobile Network
CD-ROM Compact Disk Read Only Memory
CDMA Code Division Multiple Access
eNB Evolved Node B
GPRS General Packet Radio Service
GPS Global Positioning System
GSM Global System for Mobile communications
DVD Digital Versatile Discs
EEPROM Electrically Erasable Programmable Read Only Memory
LTE Long Term Evolution
PC Personal Computer
PDA Personal Digital Assistant
RAM Random Access Memory
RF Radio-Frequency
RFID Radio-Frequency Identification
ROM Read Only Memory
RSRP Reference Transmission Receive Power
RSRQ Reference Transmission Receive Quality
RSSI Received Transmission Strength Indicator
SIM Subscriber Identify Module
TDMA Time Division Multiple Access
TOA Time-of-Arrival
TOF Time-of-Flight
T/R Transmit/Receive
UMTS Universal Mobile Telecommunications Systems Further, various technical terms are used throughout this description. An illustrative resource that describes these terms may be found in Newton's Telecom Dictionary, 27th Edition (2012). Additionally, as used in this disclosure, a "contact force" refers to a force in which contact has occurred (e.g., pushing or pulling of one object via contact with another object, spring force such as clicking a button on a pen to release the writing tool, and the like). For example, a button on a computing device or a mobile device is a physical switch that may control or trigger a function of the device in response to a contact force (e.g., a finger pushing the button). As another example, a toggle button provides for switching between two states upon receipt of a contact force.

A "mobile device," as used herein, is a device that has the capability of using a wireless communications network, and may also be referred to as a "computing device," "user device," "wireless communication device," or "user equipment (UE)." A mobile device may take on a variety of forms, such as a personal computer (PC), a laptop computer, a tablet, a mobile phone, a personal digital assistant (PDA), a server, or any other device that is capable of communicating with other devices (e.g., by transmitting or receiving a signal) using a wireless communication. A UE may be, in an embodiment, similar to user device 500, described herein with respect to FIG. 5.

"Wireless communication" and "wireless telecommunication network," as used herein, refer to the transfer of information without the use of an electrical conductor as the transferring medium. Wireless communication may include, but is not limited to, the transfer of information via radio waves (e.g., Bluetooth®), satellite communication, infrared communication, microwave communication, Wi-Fi, and mobile communication. Additionally, embodiments of the present technology may be used with different technologies or standards, including, but not limited to, CDMA 1XA, GPRS, EvDO, TDMA, GSM, WiMax technology, LTE, and/or LTE Advanced, among other technologies and standards. A wireless telecommunications network may be, in some embodiments, similar to network 126, described herein with respect to FIGS. 1-3.

In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Embodiments of the technology may be embodied as, among other things, a method, a system, a device, and/or a computer-program product. Accordingly, the embodiments may take the form of a hardware embodiment, or an embodiment combining software and hardware. In one embodiment, the technology may take the form of a computer-program product that includes computer executable instructions embodied on one or more computer-readable media.

Computer-readable media may include both volatile media, non-volatile media, removable media, non-removable media, and contemplate media readable by a database, a switch, and/or various other network devices. Network switches, routers, and related components are conventional in nature, as are methods of communicating with the same. By way of example, and not limitation, computer-readable media may include computer storage media and/or communications media.

Computer-readable media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, DVD, holographic media or other optical disc storage, magnetic cassettes, magnetic tape, magnetic disk storage, and other storage devices. These memory components may store data momentarily, temporarily, and/or permanently.

Communications media typically store computer-useable instructions—including data structures and program modules—in a modulated data signal. The term "modulated data signal" refers to a propagated signal that has one or more of its characteristics set or changed to encode information in the signal. Communications media includes any information-delivery media. By way of example, but not limitation, communications media may include wired media, such as a wired network or direct-wired connection, and wireless media such as acoustic, infrared, radio, microwave, spread-spectrum, and other wireless media technologies. Combinations of the above are included within the scope of computer-readable media. Communications media do not include signals per se.

In brief, and at a high level, this disclosure describes, among other things, a device as well as methods and systems for employing improved emergency communications. Conventional methods and systems that transmit emergency communications transmit the emergency communications to switchboards that are manually controlled, which can cause delays in subsequent transmissions of wireless communications to emergency service providers. Further, conventional methods and systems continuously track and monitor location information, which raises privacy concerns, increases usage in energy and processing power, reduces battery life and associated storage capacity, and so forth. Furthermore, conventional methods and systems fail to provide for more than one emergency service recipient of the emergency communication in response to a single contact force. Moreover, conventional methods and systems fail to provide for a customizable message and recipient of the message in response to the contact force.

The present disclosure provides for improvements to each of the deficiencies in the conventional systems described above. In one aspect, a device for emergency communications is provided. The device comprises a SIM card, at least one sensor, a processor, and a memory that stores executable instructions that, when executed by the processor, perform operations. The operations comprise detecting, via the at least one sensor, a contact force. In response to detecting the contact force, the devices initiates a location service, wherein the location service is configured to determine a geolocation of the device based at least in part on the SIM card. Further, in response to detecting the contact force, the device causes medical information associated with a user of the device to be communicated to an emergency response server. Upon the location service determining the geolocation of the device, a signal comprising the geolocation of the device is communicated to the emergency response server.

In another example embodiment of the present technology, a method for managing emergency communications is provided. The method comprises detecting an indication to transmit an emergency communication from a device, the device comprising a SIM card and a transmitter. In response to detecting the indication to transmit the emergency communication from the device, the device initiates a location service, wherein the location service is configured to determine a location of the device based at least in part on the SIM card. Further, in response to detecting the indication to transmit the emergency communication, the device causes, via the transmitter, the location of the device to be communicated to an emergency response server.

In yet another example embodiment of the present technology, one or more non-transitory computer-readable media having computer-executable instructions embodied thereon that, when executed, perform a method for managing emergency communications. The method comprises providing an indication to transmit an emergency communication from a device, the device comprising a SIM card and a transmitter. In response providing the indication to transmit the emergency communication, the device receives a first confirmation that a location service has been initiated, wherein the location service is configured to determine a location of the device based on the SIM card. Additionally, the device receives a second confirmation that the location service has transmitted the location of the device to a preprogrammed contact.

Figure 1:
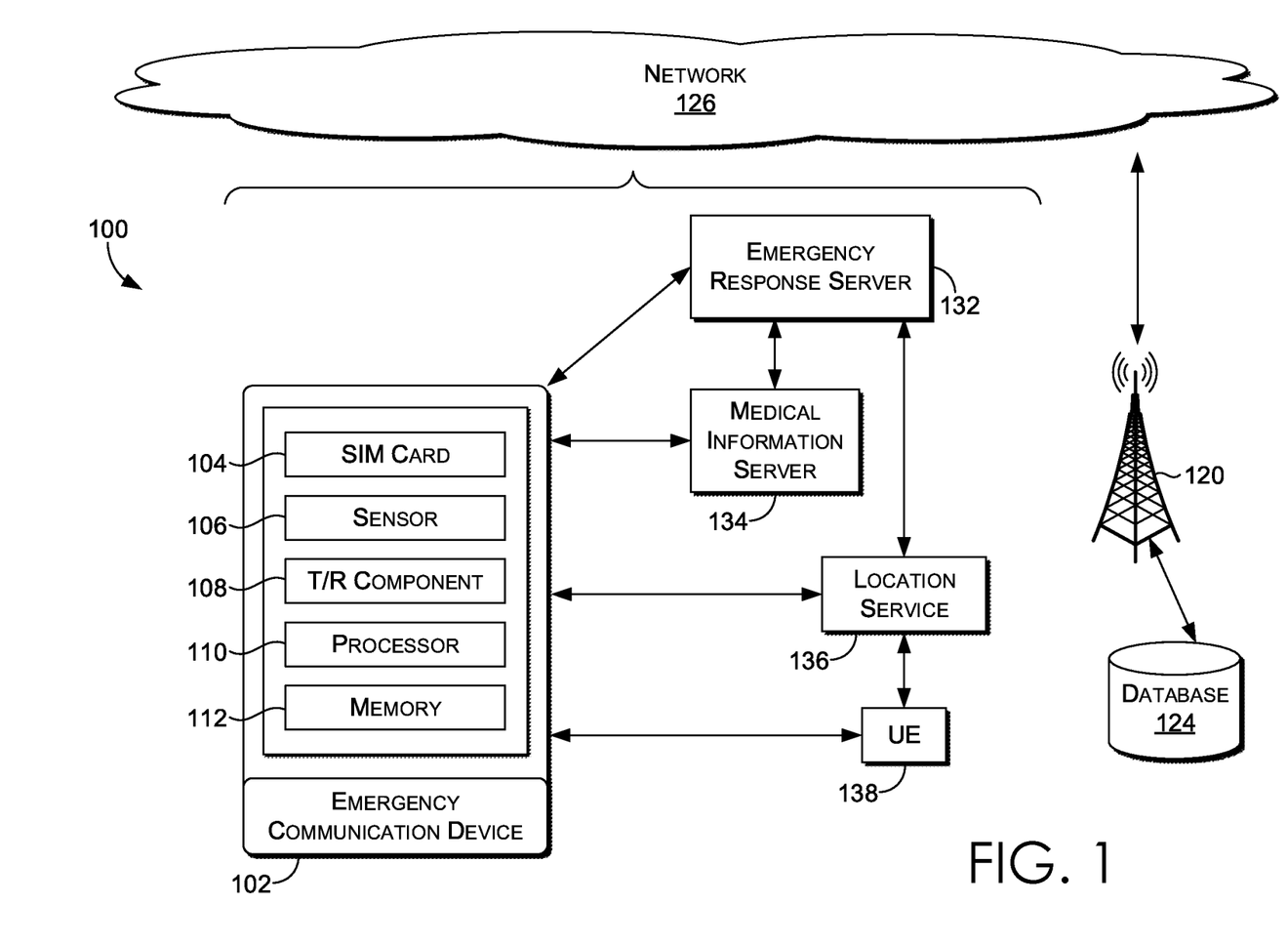
FIG. 1 depicts an example environment for using an emergency communication device, in accordance with an embodiment of the present technology.

Referring to the drawings in general, and initially to FIG. 1, example environment 100 for using an emergency communication device comprises emergency communication device 102, which is capable of wireless communications with one or more of emergency response server 132, medical information server 134, location service 136, and UE 138. Further, cell site 120 may provide wireless communications via network 126 within environment 100. Example environment 100 is but one example, and is not intended to suggest any limitation as to the scope of use or functionality of the embodiments discussed herein. Neither should the environment 100 be interpreted as having any dependency or requirement relating to any one or a combination of components illustrated. It should be noted that although some components in FIG. 1 are shown in the singular, they may be plural. For example, the environment 100 may also include multiple location services and multiple UEs.

Beginning with emergency communication device 102, the emergency communication device 102 may be small (e.g., having a diameter of 24.26 mm), may have various shapes, and may be made of various materials. For example, emergency communication device 102 may have at least one surface area having one inch in length and less than one inch in width. In some aspects, the surface area has two inches in length and less than two inches in width. In some aspects, emergency communication device 102 is circular in shape or rectangular. In some aspects, emergency communication device 102 comprises one or more of elastic material, metal, and plastic. In some aspects, emergency communication device 102 is a wearable device (e.g., attached to a bracelet, attached to a work belt, has a clip or strap attached or adhered to the device, and the like). Additional details of physical aspects of the emergency communication device 102 are discussed in FIG. 2.

The emergency communication device 102 may comprise a SIM card 104, a sensor 106, T/R component 108, processor 110, and memory 112. In some aspects, the sensor 106 may detect when a button associated with the device has been pushed. In some aspects, the sensor 106 may be associated with detecting a selection via a display screen (e.g., display screen 209). In some aspects, the sensor 106 comprises a motion detection sensor, such as a gyroscope, accelerometer, or electronic compass. For example, the motion detection sensor may detect motion associated with the emergency communication device 102. In some aspects, the sensor 106 comprises a light sensor, a proximity sensor, a thermometer, a microphone, and so forth.

In aspects, the SIM card 104 may be a removable or a non-removable from the emergency communication device 102. In some aspects, SIM card 104 is configured to encrypt voice and data transmissions and to store subscriber-specific data in the memory 112 for network 126 to identify and authenticate the user. Additionally, SIM card 104 may store data, such as personal settings specific to the user, in the memory 112. Furthermore, the data and the subscriber-specific data may be operably accessible by the processor 110 and transmittable via the T/R component 108. The subscriber-specific data may be transmitted by the T/R component 108 to another device. The SIM card 104 may comprise a plurality of external contact pins associated with T/R component 108, which may comprise an antenna that is part of a T/R system for transmitting wireless signals and for identifying radio frequency. Additionally, the memory 112 may be a ROM and may have a subscriber authentication key.

The emergency communication device 102 is configured to wirelessly communicate with one or more of emergency response server 132, medical information server 134, location service 136, and UE 138 for the transmission of a location of the emergency communication device 102. For example, cell site 120 may provide for the wireless communications via network 126. In aspects, emergency communication device 102 initiates the location service 136 in response to detecting an indication to transmit an emergency communication. For example, the indication to transmit the emergency communication may correspond to the detection by the sensor 106 of a contact force, such as a user pushing a button of the emergency communication device 102. Upon determination of the location of the emergency communication device 102 by the location service 136, the location service 136 or the emergency communication device 102 may transmit the location to the emergency response server 132, described in more detail below.

Turning to cell site 120, the terms "cell site" and "base station" may be used interchangeably herein to refer to a defined wireless communications serviceable area that is serviced by a base station. Cell site 120 may communicate (by receiving or transmitting) with database 124 and provide wireless communication services via network 126. In particular, cell site 120 may be configured to wirelessly communicate with one or more of the emergency communication device 102, the emergency response server 132, the medical information server 134, the location service, and UE 138; which are located within a serviceable area defined by a transmission range and/or receiving range of an antenna array of the cell site 120.

Cell site 120 may include one or more base stations, carriers, band pass filters, radios, antennas, antenna arrays, power amplifiers, transmitters/receivers, digital signal processors, control electronics, GPS equipment, and the like. As discussed herein, cell site 120 is deployed in network 126 to control and facilitate, via one or more antenna arrays, the broadcast, transmission, synchronization, and receipt of one or more wireless signals in order to communicate with, verify, authenticate, and provide wireless communications service coverage to one or more UEs and/or other types of devices that request to join and/or are connected to the network 126.

In some aspects, cell site 120 may comprise one or more macro cells (providing wireless coverage for users within a large serviceable area). For example, macro cells may correspond to a coverage area having a radius of approximately 1-15 miles or more, the radius measured at ground level and extending outward from an antenna at the cell site 120. In some aspects, cell site 120 may comprise, or be in communication with, one or more small cells (providing wireless coverage for users within a small geographic area). For example, a small cell may correspond to a coverage area having a radius of approximately less than three miles, the radius measured at ground level and extending outward from an antenna at the cell site 120. In embodiments, cell site 120 is in communication with a plurality of in-door small cells. In some embodiments, both the one or more small cells and the one or more macro cells establish network 126, forming a heterogeneous network.

In some embodiments, cell site 120 comprises an antenna array having one or more antenna elements. In aspects, the one or more antenna elements may be dipole antennas having a length, for example, of ¼, ½, 1, or 1½ wavelength. In aspects, the antenna array may be an active antenna array, FD-MIMO, massive MIMO, 3G, 4G, 5G, another generation communication system, and/or 802.11. In other aspects, the antenna array may comprise monopole, loop, parabolic, traveling-wave, aperture, yagi-uda, conical spiral, helical, conical, radomes, horn, and/or apertures, or any combination thereof. In some aspects, each antenna element has a dedicated power supply, a power amplifier, and a processor for controlling or adjusting the power supply.

Database 124 can be any collection of records. In one embodiment, database 124 corresponds with a memory that includes a set of embodied computer-executable instructions that, when executed, facilitate various aspects disclosed herein. Additionally, a "computer-readable medium" (e.g., flash memory, magnetic disk) includes a single medium or multiple media, such as a centralized or distributed database, and/or associated caches and servers that store one or more sets of computer-executable instructions. The computer-executable instructions will variously be referred to as "instructions" for short.

With respect to network 126, network 126 may be a telecommunications network(s), or a portion thereof. A telecommunications network might include an array of devices or components (e.g., one or more base stations), some of which are not shown. Those devices or components forming the network 126 may form network environments similar to what is shown in FIG. 1, and may also perform methods in accordance with the present disclosure. Components such as terminals, links, and nodes (as well as other components) may provide connectivity in various implementations. Network 126 may include multiple networks, as well as being a network of networks, but is shown in more simple form so as to not obscure other aspects of the present disclosure.

Network 126 may be part of a telecommunication network that connects subscribers to their service provider. In aspects, the service provider may be a telecommunications service provider, an internet service provider, or any other similar service provider that provides at least one of voice telecommunications and data services to any or all of the user devices within network 126. For example, network 126 may be associated with a telecommunications provider that provides services (e.g., LTE) to UE 138. Additionally or alternatively, network 126 may provide voice, SMS, and/or data services to user devices or corresponding users that are registered or subscribed to utilize the services provided by a telecommunications provider. Network 126 may comprise any communication network providing voice, SMS, and/or data service(s), using any one or more communication protocols, such as a 1× circuit voice, a 3G network (e.g., CDMA, CDMA2000, WCDMA, GSM, UMTS), a 4G network (WiMAX, LTE, HSDPA), a 5G network, or another generation communication system. The network 126 may also be, in whole or in part, or have characteristics of, a self-optimizing network.

Turning to emergency response server 132, the emergency response server may comprise a server having a physical location, a network-based server, or a combination thereof that is associated with an emergency service. Emergency services may include a city or local police department, a fire department, a town public works department, an industrial fire department, a private security organization, an emergency medical services provider, and the like. In some aspects, the emergency response server 132 is a legacy 911 server, a next generation 911 server, or an emergency text 911 server. In an aspect, emergency communication device 102 may be pre-programmed by a user to transmit particular emergency messages to the emergency text 911 server (or a similar text server in various locations). For example, if the user is a miner and carries emergency communication device 102 on a work belt during shifts, the pre-programmed message may include information corresponding to the user being a miner and the mine in which the user is working.

In another aspect, a pre-programmed emergency message for a truck driver or a driver delivering goods or services may include a license plate of the work vehicle. Continuing the example, if the driver is transporting a hazardous material, the pre-programmed emergency message may include information associated with cargo being transported by the driver, such as a chemical name, a trade name, or a generic name of the hazardous material. In some embodiments, a pre-programmed emergency message for a government employee, such as a United States Marine, may be transmitted to a private server unavailable to other users of the emergency communication device 102, such as civilians. In some embodiments, a pre-programmed emergency message to an emergency medical services provider for someone with a particular medical condition, such as epilepsy, may include information corresponding to the epilepsy condition.

In some aspects, emergency communication device 102 causes a signal comprising the geolocation of the device to be communicated to the emergency response server 132. For example, emergency communication device 102 may transmit its location or information corresponding to its location to the emergency response server 132. As another example, the emergency communication device 102 may cause location service 136 to transmit the location of the emergency communication device 102 to the emergency response server 132 based on the location service 136 determining the location of the emergency communication device 102 based in part on the SIM card 104.

In some aspects, emergency communication device 102 simultaneously transmits both a general location to the emergency response server 132 and location information to the location service 136 for a more accurate determination of the location of the emergency communication device 102. The general location may include a building address or an area of an excavation site, for example. The more accurate determination of the location may include a specific floor and room number of the building address or a particular region of the excavation area (e.g., latitude, longitude, elevation) in near real-time or real-time. Upon the more accurate determination of the location by the location service 136, the location service 136 may automatically transmit the more accurate location to the emergency response server 132.

Turning to medical information server 134, medical information server 134 may receive a signal from the emergency communication device 102 that causes the medical information server 134 to communicate particular information to the emergency response server 132. The information received may include the subscriber-specific data, which may be associated with a particular medical history profile of the user of the emergency communication device 102. The medical history profile may comprise electronic medical record data, such as current medications, allergies, chronic conditions (e.g., heart disease), chronic mental illnesses (e.g., schizophrenia), and so forth. In aspects, the user may update the medical history profile via an electronic fillable form. In some aspects, a healthcare provide may update the medical history profile. Conventional devices and systems do not provide for causing the transmission of medical information to an emergency service provider, which can result in emergency service providers failing to properly provide emergency services for people with particular medical conditions, such as chronic heart conditions, for example.

Turning to location service 136, the location service may, upon receipt of a communication from the emergency communication device 102, determine a geolocation (e.g., a latitude and longitude) of the emergency communication device 102. The location service 136 may use the subscriber-specific data from the SIM card 104 when determining the location of the emergency communication device 102. In aspects, location service 136 may determine the location relative to a position of one or more access points within a range of the emergency communication device 102. In some aspects, location service 136 uses GPS based on one or more signals transmitted by the emergency communication device 102 (e.g., by measuring uplink times of the one or more signals received).

In some aspects, the location service 136 may determine the location based on signaling transmitted by one or more 5G transmission beacons within a range of the emergency communication device 102. The one or more 5G transmission beacons may include, for example, a terrestrial transmitter that transmits a terrestrial positioning signal. The 5G transmission beacons may also or alternatively provide other location information, such as location coordinates for the one or more 5G transmission beacons themselves, a current time of the transmissions (e.g. a GPS time), and additional terrestrial positioning signal and location information (e.g., terrestrial positioning signal parameters) associated with access points in communication with a 5G base station (e.g., cell site 120) and within the range of the emergency communication device 102.

In some aspects, the location service 136 is configured to determine the location of the emergency communication device 102 based on a receiver (e.g., T/R component 108) of the emergency communication device 102 and one or more of the following: indoor Bluetooth proximity detection, trilateration (e.g., angle of arrival, TOA, or a combination of angle of arrival and TOA), and fingerprinting. For example, location service 136 may determine a proximity of the emergency communication device 102 to a Wi-Fi, Bluetooth®, or other wireless access point by a sensing technique using RSSI, TOA, or TOF measurements. As another example, the location may be determined via an RSS fingerprint-based Wi-Fi positioning method using one or more access points within a particular building. In yet another example, the fingerprinting comprises RSSD and compressive sensing.

Furthermore, the location service 136 may additionally determine the location based on beamforming information. For example, the beamforming information may be used to determine a vertical position of the emergency communication device 102. The beamforming information may comprise RSRP, RSRQ, RSSI, a reference signal time difference, and a signal propagation time corresponding to a directional positioning reference signal transmitted by cell site 120 through an antenna array configured to beamform. Furthermore, in some aspects, location service 136 determines the emergency communication device 102 location using triangulation with respect to cell site 120, a Wi-Fi access point nearby, and so forth.

Upon determination of the location of the emergency communication device 102, the location service 136 may transmit the location to the emergency response server 132. In some aspects, the location service 136 transmits the location to the emergency communication device 102 or to another user device (e.g., UE 138) associated with a pre-programmed emergency contact, such as a family member, healthcare provider, and so forth.

Turning to UE 138, the UE may take on a variety of forms including: a PC, a user device, a smart phone, a smart watch, a laptop computer, a mobile phone, a mobile device, a tablet computer, a wearable computer, a PDA, a server, a CD player, an MP3 player, a GPS device, a video player, a handheld communications device, a workstation, a router, a hotspot, and any combination of these delineated devices, or any other device (such as the computing device 500 in FIG. 5) that communicates via wireless communications to interact with a public or private network (e.g., network 126).

In aspects, UE 138 may be capable of communicating using 4G (e.g., LTE) and/or 5G. In some aspects, UE 138 may be E-UTRAN New Radio—Dual Connectivity devices (ENDC). ENDC allows a user device to connect to an LTE eNB that acts as a master node and a 5G gNB that acts as a secondary node. As such, in these aspects, UE 138 may access both LTE and 5G simultaneously, and in some cases, on the same spectrum band. As shown in FIG. 1, UE 138 may communicate by way of transmission with cell site 120 using one or more of 4G and 5G, sometimes simultaneously. Additionally, other wireless communication protocols may be utilized in conjunction with aspects described herein, as LTE and 5G are used as examples.

Figure 2:
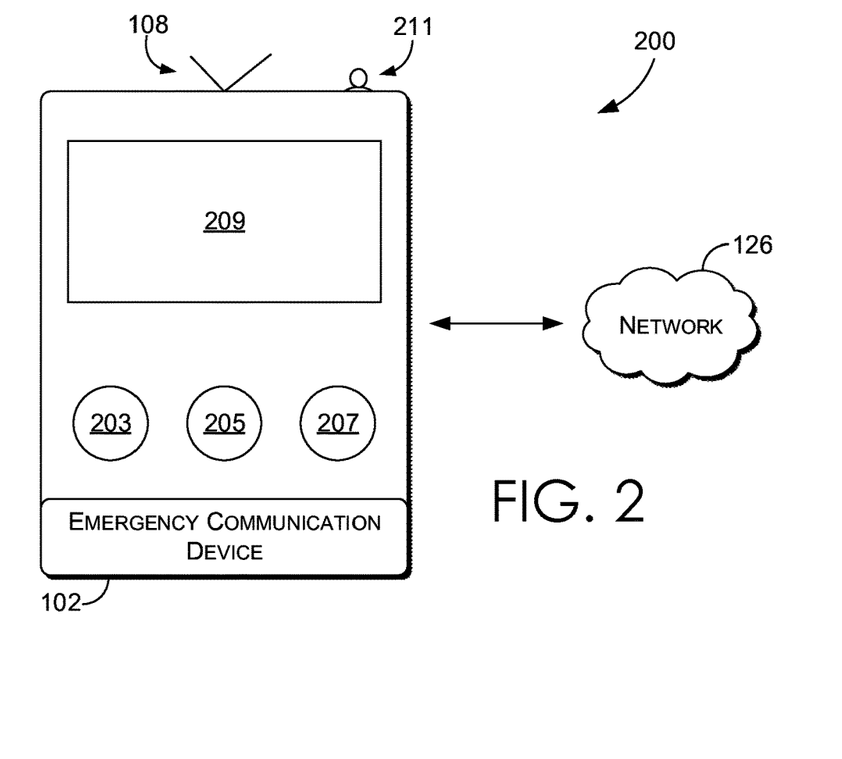
FIG. 2 illustrates an example emergency communication device, in accordance with an embodiment of the present technology.

Turning to FIG. 2, example environment 200 comprises an example emergency communication device 102 in communication with network 126 (previously described above with respect to FIG. 1). In environment 200, the emergency communication device 102 comprises a first button 203, a second button 205, a third button 207, a T/R component 108 (the functioning of which was previously described above with respect to FIG. 1), a display screen 209, and a visual confirmation component 211.

Beginning with buttons 203, 205, and 207, the location of the buttons 203, 205, and 207 are illustrative and may be positioned differently in other embodiments. As one example (not depicted), one or more of the buttons 203, 205, and 207 may be located on the side of the emergency communication device 102. In some embodiments, one or more buttons 203, 205, and 207 may be a virtual button selectable via the display screen 209. In some embodiments, one or more of buttons 203, 205, and 207 may activate a microphone sensor (e.g., sensor 106 in FIG. 1). In some embodiments, one or more of buttons 203, 205, and 207 may initiate a location service for transmission of a geolocation of the emergency communication device 102 to an emergency server. In some embodiments, upon selection of one or more of buttons 203, 205, and 207, the button selected illuminates upon transmission of the initiation of the location service, wherein the illumination is a confirmation that the location service has been initiated.

Furthermore, in some aspects, selection of one of the one or more buttons 203, 205, and 207 may cancel the communication of the transmission of the geolocation. Alternatively, a safety switch (not depicted) of the emergency communication device 102 may be used to preventing accidental selections of one of the buttons 203, 205, and 207. In aspects, activation of the safety switch may be based on a contact force of the safety switch alone; alternatively, activation of the safety switch may be based on simultaneously manipulating the safety switch and the relevant button (of buttons 203, 205, and 207) accidently pressed.

In some aspects, the first button 203 may cause the location of the device to be communicated to a first emergency response server, and the second button 205 may cause the location of the device to be communicated to a second emergency response server. In some aspects, a first location service transmits the location to the first emergency response server and a second location service transmits the location to the second emergency response server. In an aspect, the first emergency response server is associated with a public response server and the second emergency response server is associated with a private response server. In an aspect, the first emergency response server is associated with a local 911 response server and the second emergency response server is associated with a city 911 response server.

In some embodiments, the first button 203 communicates medical information associated with a user of the device to be communicated to the emergency response server. In some aspects, a server having access to a medical history profile of the user comprising the medical information communicates the medical information to the emergency response server. In aspects, a user may provide the medical information (to be transmitted to the server having access to the medical history profile) by filling out an electronic form or by authorizing a certain user having access to the server to provide particular medical information in the medical history profile.

In some embodiments, one or more of the 203, 205, and 207 may cause a signal comprising the geolocation of the device to be communicated to a preprogrammed emergency contact. For example, pressing the third button 207 may result in communication of the location of the emergency communication device 102 to a device (e.g., UE 138) of a preprogrammed contact (e.g., a primary care doctor, a cardiologist, a relative, and so forth). In some embodiments, the emergency communication device 102 or the location service may communicate the geolocation to the preprogrammed contact.

In aspects, the emergency communication device may be programmed to transmit location information or medical information to a first contact (e.g., an entity associated with an employer of the user, such as a company operator, switchboard, or control center). In aspects, the emergency communication device may be programmed to transmit a first message upon pressing the first button, a second message upon pressing the second button, and a third message upon pressing the third button. Further, one or more information items could be programmed to be communicated from a remote server to a destination upon activation of one of the buttons: for example, if the third button is programmed to contact 911 with a message requesting emergency medical services, activation of the third button could be further programmed to cause an electronic health record from another server (e.g., an electronic health record server) to be transmitted to 911.

Turning to T/R component 108, T/R component 108 may have one or more transmit powers and differing transmitting and receiving frequencies. In some aspects, the T/R component 108 enables wireless and contactless proximity-based communication between the emergency communication device 102 and one or more servers or a with a UE. In some aspects, T/R component receives information from a global navigation satellite system.

In some embodiments, display screen 209 provides a visual confirmation, such as a textual word or an image, that the location of the emergency communication device 102 has been transmitted (e.g., to a server). In some embodiments, display screen 209 provides a virtual button for receiving an indication to transmit an emergency communication. In some embodiments, display screen 209 indicates a name of a server that the location was transmitted to (e.g., "911").

In some embodiments, visual confirmation component 211 comprises a light for notifying a user of the emergency communication device 102 that a location or medical information has been transmitted to a recipient. In some aspects, a first confirmation is provided in response to the location service determining the location of the emergency communication device 102 and a second confirmation is provided upon receipt of the location by the intended recipient (e.g., a UE of a preprogrammed contact or an emergency response server). In some aspects, the first confirmation is provided in response to the server having the medical information of the user of the emergency communication device receiving a communication from the emergency communication device 102, and the second confirmation is provided upon receipt of the medical information by the emergency response server.

From the perspective of a user, in aspects, a user provides an indication to transmit an emergency communication from the emergency communication device 102. For example, the user may push one or more of buttons 203, 205, and 207. In response to the user providing the indication, the user then receives a first confirmation that the location service has been initiated. For example, the first confirmation may comprise visual confirmation component 211 lighting up for a period of time or blinking. Additionally, after the user has provided the indication, a second confirmation may be received, wherein the second confirmation is associated with the location service transmitting the location of the device to a preprogrammed contact or to the emergency response server. In some aspects, the second confirmation includes haptic feedback (e.g., one or more vibrations of the emergency medical device). In some aspects, the second confirmation includes a textual notification on display screen 209.

Figure 3:
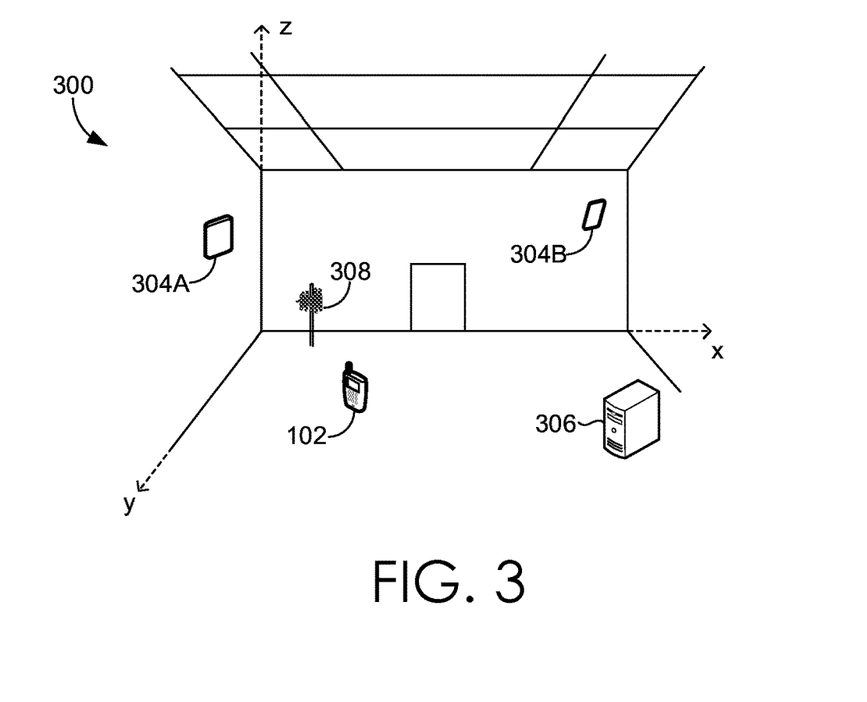
FIG. 3 depicts an example environment for using an emergency communication device, in accordance with an embodiment of the present technology.

Turning to FIG. 3, example environment 300 may be associated with a room in a building, for example. In aspects, example environment 300 comprises emergency communication device 102, positioning devices 304A and 304B, Wi-Fi access point 306, and low-powered radio access node 308. In aspects, positioning devices 304A and 304A may comprise RFID tags, indoor beacons, indoor transmitters, near field communication transmitters, ultra high frequency transmitters, and so forth. Additionally, in some aspects, low-powered radio access node 308 comprises a small cell access node that may obtain geolocation information from emergency communication device. Further, the small cell access node may be coupled to a wireless network (such as network 126, for example) via a wireless link comprising a downlink and an uplink for the utilization of a predetermined band of radio frequency.

In aspects, the location service receives information from an indoor localization system, such as example indoor localization system depicted in example environment 300 (including one or more of the positioning devices 304A and 304B, Wi-Fi access point 306, and low-powered radio access node 308). The location service may use the information received by the indoor localization system to determine the location of the emergency communication device 102. In some aspects, a processor of the emergency communication device 102 processes location information received by the indoor localization system and transmits the processed information to the location service.

The indoor localization system may be based on one or more types of wireless signal transmissions, such as infrared, Wi-Fi, Bluetooth, RFID, ultrasound, ultra-wideband, and so forth. In aspects, the indoor localization system is configured to acquire the location information comprising one or more of a latitude, longitude, altitude, room number, time, date, geocode, and so forth. In some aspects, the location service maps the positioning devices (e.g., positioning device 304A and 304B in the room of environment 300) of the indoor localization system for the determination of the location of emergency communication device 102. Stated differently, the location service is configured to determine the location of the emergency communication device 102 based on fingerprinting.

For example, the fingerprinting may be associated with a map of a predefined infrastructure (e.g., a layout of a building and rooms within the building) and a grid of points. Continuing the example, the grid of points may correspond to positions of an access point (e.g., low-powered radio access node 308) that receives sensor data. The map may be continuously updated within a predefined period of time in response to receiving the sensor data, and wherein data associated with the map is stored on a server database that is in communication with the location service. In some aspects, the grid of points may correspond to locations of the access point and to the positioning devices (e.g., positioning devices 304A and 304B). In some aspects, the location service determines the location of the emergency communication device 102 using a received RSSI signal corresponding to the Wi-Fi signal generated by the Wi-Fi access point 306.

Figure 4:
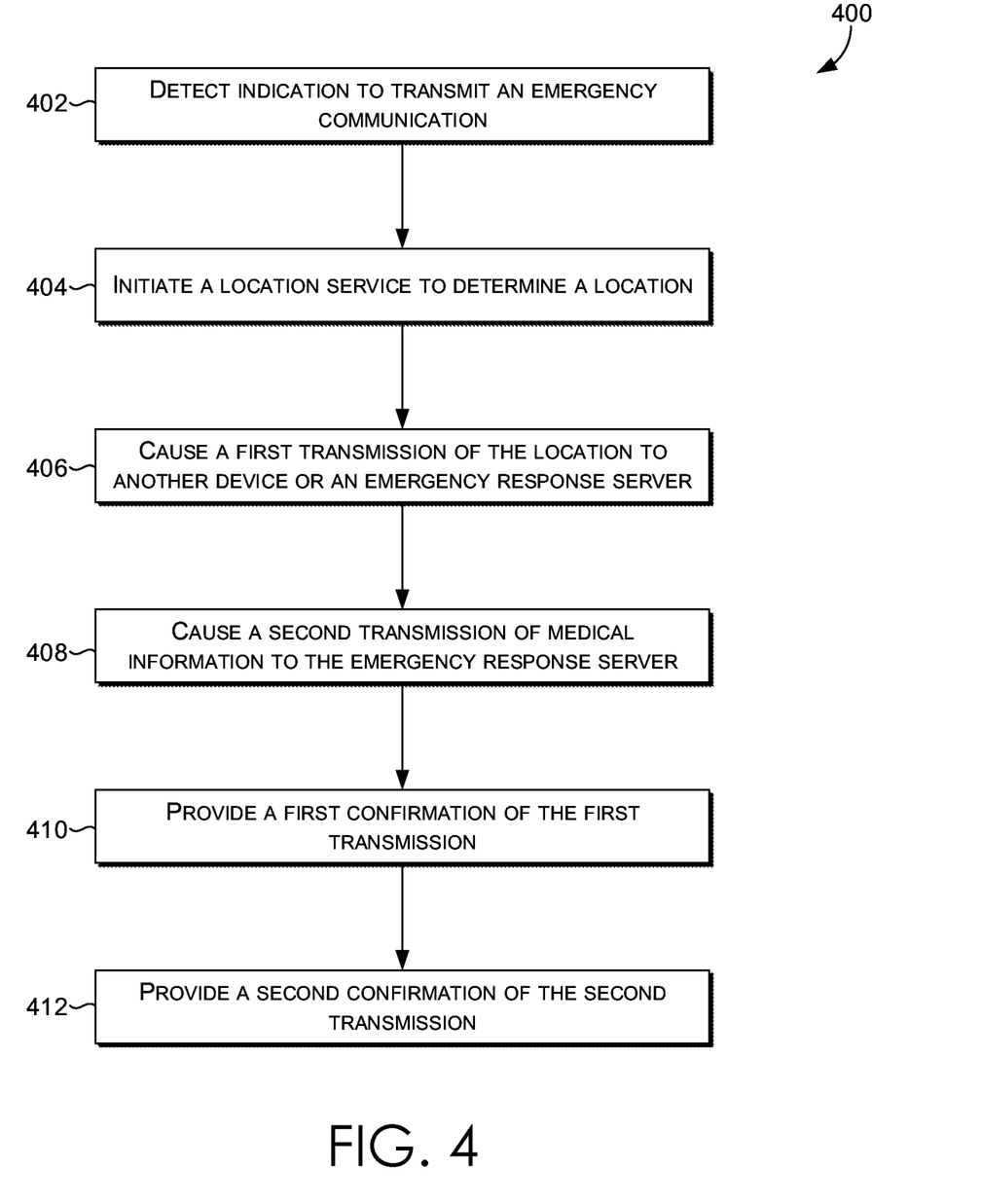
FIG. 4 depicts an example flowchart, in accordance with an embodiment of the present technology.

Turning now to FIG. 4, example flowchart 400 of a method begins at 402 with detecting an indication to transmit an emergency communication via an emergency communication device. In some aspects, the indication to transmit the emergency communication may include detecting a contact force via a sensor, such as detecting a button being pressed on the emergency communication device, a moved toggle switch, selection of an icon on a touch screen, and so forth. Additionally, in some embodiments, an emergency communication may correspond to a communication relating to a crime, a fire, an accident, a natural disaster, a medical emergency, a terrorist attack, a domestic dispute, a pandemic, and other types of emergencies.

At 404, the method initiates a location service to determine a location of the emergency communication device in response to the detected contact force. In aspects, the location service is not initiated prior to detecting the contact force. Further, the location service may be configured to determine a geolocation of the emergency communication device based on a SIM card associated with the device. For example, the location service may receive information from the emergency communication device comprising one or more positions (e.g., a wireless local area network media access control address). In some aspects, the location service may receive credentials associated with the SIM card associated with an identity of the emergency communication device.

In some aspects, the location service is configured to determine the location of the emergency communication device based on positions of a plurality of access points communicatively coupled with a cell site. For example, the plurality of access points may include a wireless local area network access point (e.g., Wi-Fi) or a small cell comprising a crowdsourcing client to perform access network observations using a network listen receiver. The network listen receiver may receive downlink signals (from UEs and from the emergency communication device) and global navigation satellite system readings, in some embodiments. Further, the location of one or more small cells may be known or determined by the location service based on a broadband connection of each small cell.

In some aspects, the location service is configured to determine the location of the emergency communication device based on GPS localization (or another satellite-based position-determining mechanism). For example, the emergency communication device may comprise a GPS receiver, which may be configured to obtain geolocation data associated with the emergency communication device. Additionally, the location service may be configured to measure a geographic location in three-dimensions (e.g., latitude, longitude, and altitude).

At 406, the method causes a first transmission of the location of the emergency communication device to another device or to an emergency response server. The emergency response server may be associated with a police department or a fire department, for example. Additionally, the other device may include a UE, which may be associated with a preprogrammed emergency contact. For example, the transmission of the location to the other device may occur in response to a user of the emergency communication device selecting a particular button among a plurality of buttons on the emergency communication device. In embodiments, the preprogrammed emergency contact is a work supervisor, a relative, a friend, a medical care provider (e.g., a doctor), a spouse, and so forth. In aspects, the preprogrammed contact is unassociated with the emergency response server.

At 408, the method causes a second transmission of medical information to the emergency response server. The medical information may be associated with the user of the device. The medical information may correspond to the emergency (e.g., the emergency is a miner trapped underground and the medical information is that the worker has a respiratory condition). The medical information may also include a medical condition that may require an enhanced emergency response, such as needing particular supplies (e.g., cardiovascular medicine or allergy medicine) for the user of the emergency communication device or a faster emergency response (e.g., an ambulance for someone prone to seizures or heart attacks).

In addition, the medical information may be communicated to the emergency response server via a server having access to a medical history profile of the user of the emergency communication device. For example, the user may have filled out information on an electronic form and stored it on the server to create the medical history profile. The medical history profile may include information including age, gender, prescriptions, medical history, mental history, allergies, diagnoses, and so forth. In some aspects, the medical history profile is associated with one or more healthcare providers.

At 410, the method provides a first confirmation of the first transmission of the location of the emergency communication device. For example, the first confirmation may comprise one or more of the following: a visual confirmation, such as a light or an image on a display screen; a sound; and haptic feedback, such as a vibration. At 412, the method provides a second confirmation of the second transmission of the medical information to the emergency response server. The second confirmation may comprise one or more of the following: a visual confirmation, a sound, and haptic feedback.

Figure 5:
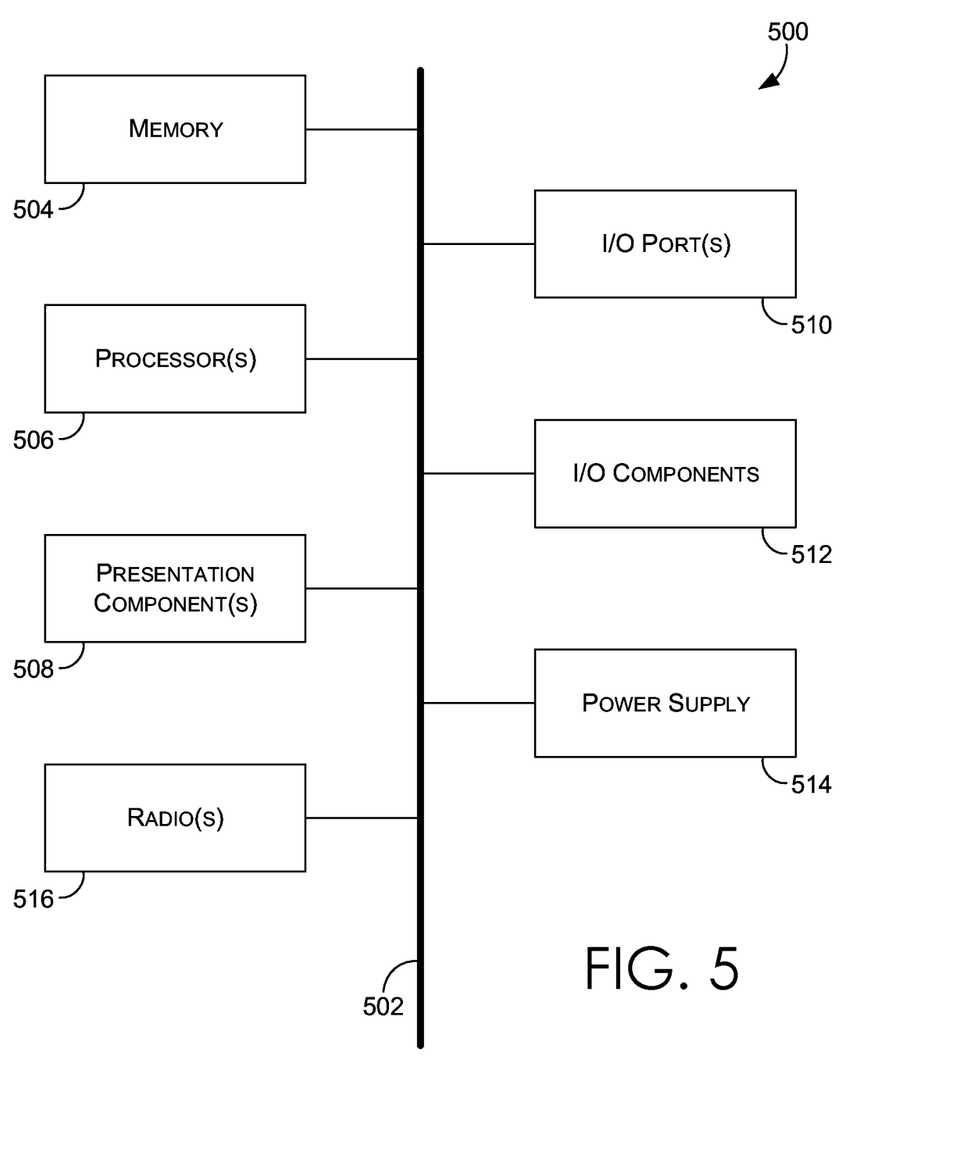
FIG. 5 illustrates an example computing environment, in accordance with an embodiment of the present technology.

Turning now to FIG. 5, a diagram is depicted of an exemplary computing environment suitable for use in implementations of the present disclosure. In particular, the exemplary computer environment is shown and designated generally as UE/user device 500. User device 500 is but one example of a suitable computing environment and is not intended to suggest any limitation as to the scope of use or functionality of the invention. Neither should user device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, user device 500 includes bus 502 that directly or indirectly couples the following devices: memory 504, one or more processors 506, one or more presentation components 508, input/output (I/O) port(s) 510, I/O component(s) 512, power supply 514, and radio(s) 516. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O component(s) 512. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "user device."

User device 500 typically includes a variety of computer-readable media. Computer-readable media can be any available media that can be accessed by user device 500. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Further, computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Turning to memory 504, memory 504 includes computer-storage media in the form of volatile and/or nonvolatile memory. Memory 504 may be removable, nonremovable, or a combination thereof. Examples of memory 504 include solid-state memory, hard drives, optical-disc drives, etc. For instance, memory 504 may include RAM, ROM, Dynamic RAM, a Synchronous Dynamic RAM, a flash memory, a cache memory, a buffer, a short-term memory unit, a long-term memory unit, or other suitable memory units. Removable memory may include, for example, a hard disk drive, a floppy disk drive, a Compact Disk drive, a CD-ROM drive, a DVD drive, or other suitable removable units.

Turning to the one or more processors 506, the one or more processors 506 read data from various entities such as bus 502, memory 504 or I/O component(s) 512. The one or more processors 506 include, for example, a Central Processing Unit, a Digital Signal Processor, one or more processor cores, a single-core processor, a dual-core processor, a multiple-core processor, a microprocessor, a host processor, a controller, a plurality of processors or controllers, a chip, a microchip, one or more circuits, circuitry, a logic unit, an IC, an ASIC, or any other suitable multi-purpose or specific processor or controller. Further, the one or more processors 506 execute instructions, for example, of an Operating System of the user device 500 and/or of one or more suitable applications.

Further, the one or more presentation components 508 present data indications to a person or other device. Examples of one or more presentation components 508 include a display device, speaker, printing component, vibrating component, etc. Additionally, I/O port(s) 510 allow user device 500 to be logically coupled to other devices including I/O component(s) 512, some of which may be built in user device 500. Illustrative I/O component(s) 512 may include a microphone, joystick, game pad, satellite dish, scanner, printer, wireless device, etc. Furthermore, power supply 514 may include any suitable source of power, such as a rechargeable lithium polymer battery and/or an alternating current power converter.

Turning to radio 516, the radio 516 facilitates communication with a wireless telecommunications network. For example, radio 516 may facilitate communication via wireless communication signals, RF signals, frames, blocks, transmission streams, packets, messages, data items, and/or data. The terms "radio," "controller," "antenna," and "antenna array" are used interchangeably to refer to one or more software and hardware components that facilitate sending and receiving wireless radio-frequency signals, for example, based on instructions from a cell site. Radio 516 may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via mmWaves, FD-MIMO, massive MIMO, 3G, 4G, 5G, and/or 802.11 protocols and techniques, etc.

Illustrative wireless telecommunications technologies that radio 516 may facilitate include CDMA, GPRS, TDMA, GSM, and the like. Radio 516 might additionally or alternatively facilitate other types of wireless communications including Wi-Fi, WiMAX, LTE, or other VoIP communications. As can be appreciated, in various embodiments, radio 516 can be configured to support multiple technologies and/or multiple radios can be utilized to support multiple technologies.

Many different arrangements of the various components depicted, as well as components not shown, are possible without departing from the scope of the claims herein. Embodiments of the technology have been described with the intent to be illustrative rather than restrictive. Alternative embodiments will become apparent to readers of this disclosure after and because of reading it. Alternative methods of implementing the aforementioned subject matter may be performed without departing from the scope of the claims herein. Certain features and sub-combinations are of utility and may be employed without reference to other features and sub-combinations, which is contemplated as within the scope of the claims.

What is claimed is:

1. A device for emergency communications, the device comprising:
    a subscriber identity module (SIM) card;
    at least one sensor;
    a processor;
    a button for causing a signal comprising a geolocation of the device to be communicated to a preprogrammed emergency contact;
    a memory that stores executable instructions that, when executed by the processor, perform operations comprising:
    detecting, via the at least one sensor, a contact force;
    in response to detecting the contact force:
    initiating a location service, wherein the location service is configured to determine the geolocation of the device based at least in part on the SIM card;
    causing medical information associated with a user of the device to be communicated to an emergency response server;
    causing the signal comprising the geolocation of the device to be communicated to the emergency response server;
    detecting a selection of the button; and
    causing the signal comprising the geolocation of the device to be communicated to a user device of the preprogrammed emergency contact.

2. The device of claim 1, wherein causing the medical information to be communicated to the emergency response server comprises instructing a server having access to the medical information to transmit the medical information to the emergency response server.

3. The device of claim 2, wherein the device further comprises a button to cancel the communication of the signal comprising the geolocation of the device and a visual confirmation that the signal is being communicated.

4. The device of claim 3, further comprising in response to communicating the signal comprising the geolocation of the device to the emergency response server, providing the visual confirmation that the signal is being communicated, wherein the emergency response server includes a legacy 911 server or a next generation 911 server.

5. The device of claim 1, wherein the location service is not initiated prior to detecting the contact force.

6. A method for managing emergency communications, the method comprising:
    detecting an indication to transmit an emergency communication from a device, the device comprising a subscriber identity module (SIM) card and a transmitter;
    in response to detecting the indication to transmit the emergency communication from the device:
    initiating a location service, wherein the location service is configured to determine a location of the device based at least in part on the SIM card; and
    causing, via the transmitter, the location of the device to be communicated to an emergency response server,
    wherein the indication to transmit the emergency communication is detected from one of at least three buttons on the device, wherein a first button of the at least three buttons causes the location of the device to be communicated to a first emergency response server, and wherein a second button of the at least three buttons causes the location of the device to be communicated to a second emergency response server.

7. The device of claim 6, wherein the location service is configured to determine the location of the device based on a receiver of the device and one or more of the following: indoor Bluetooth proximity detection, trilateration, and fingerprinting.

8. The method of claim 6, the method further comprising causing, in response to detecting the indication to transmit the emergency communication via the first button, medical information associated with a user of the device to be communicated to the first emergency response server via a server having access to a medical history profile of the user comprising the medical information.

9. The method of claim 8, the method further comprising causing, in response to detecting a second indication to transmit the emergency communication via a third button of the at least three buttons, the location of the device to be communicated to a preprogrammed contact via a user device of the preprogrammed contact.

10. The method of claim 8, wherein the method further comprises:
    detecting the indication to transmit the emergency communication via the second button; and
    causing the location of the device to be communicated to the second emergency response server.

11. The method of claim 8, wherein the location of the device is determined by the location service based on GPS localization.

12. The method of claim 11, wherein the location of the device is determined by the location service based on positions of a plurality of access points communicatively coupled with a cell site.

13. One or more non-transitory computer-readable media having computer-executable instructions embodied thereon that, when executed, perform a method for managing emergency communications, the method comprising:
    providing an indication to transmit an emergency communication from a device, the device comprising a subscriber identity module (SIM) card and a transmitter;
    in response to providing the indication to transmit the emergency communication:
    receiving a first confirmation that a location service has been initiated, wherein the location service is configured to determine a location of the device based on the SIM card; and
    receiving a second confirmation that the location service has transmitted the location of the device to a preprogrammed contact,
    wherein the indication to transmit the emergency communication is a selection of at least one of three or more buttons on the device, wherein a first button of the three or more buttons causes the location of the device to be communicated to an emergency response server.

14. The one or more non-transitory computer-readable media of claim 13, further comprising:
    providing the indication to transmit the emergency communication via a second button of the three or more buttons; and
    receiving the second confirmation that the location of the device was communicated to a user device of the preprogrammed contact, wherein the second confirmation comprises haptic feedback or a visual confirmation.

15. The one or more non-transitory computer-readable media of claim 13, further comprising:
   providing the indication to transmit the emergency communication via a third button of the three or more buttons; and
   receiving the second confirmation that the location of the device and medical information associated with a user of the device was communicated to the emergency response server, wherein the medical information was communicated to the emergency response server by a server having access to the medical information.

16. The one or more non-transitory computer-readable media of claim 15, wherein the second confirmation, based on providing the indication to transmit the emergency communication via the third button, is a confirmation that the device is:
   causing the location and the medical information to be communicated to the emergency response server; and
   causing the location to be communicated to a user device of the preprogrammed contact, wherein the preprogrammed contact is unassociated with the emergency response server.

* * * * *